United States Patent [19]

Sakai

[11] Patent Number: 5,426,549
[45] Date of Patent: Jun. 20, 1995

[54] MAGNETIC HEAD POSITIONING MECHANISM HAVING ELECTRICAL WIRING PLATED THEREUPON

[75] Inventor: Yoshihiro Sakai, Ibaragi, Japan

[73] Assignee: NEC Corporation, Tokyo, Japan

[21] Appl. No.: 98,732

[22] Filed: Jul. 29, 1993

[30] Foreign Application Priority Data

Jul. 30, 1992 [JP] Japan .................. 4-204138

[51] Int. Cl.⁶ .............................................. G11B 5/55
[52] U.S. Cl. ................................. 360/106; 360/97.01
[58] Field of Search ....................... 360/106, 104, 97.01

[56] References Cited

U.S. PATENT DOCUMENTS

| | | | |
|---|---|---|---|
| 4,949,194 | 8/1990 | MacPherson | 360/106 X |
| 5,055,969 | 10/1991 | Putnam | 360/104 |
| 5,121,273 | 6/1992 | Slezak | 360/104 |
| 5,140,482 | 8/1992 | Kimura | 360/104 |
| 5,216,559 | 6/1993 | Springer | 360/106 |

FOREIGN PATENT DOCUMENTS 61-287082 12/1986 Japan .................. 360/104

*Primary Examiner*—A. J. Heinz
*Attorney, Agent, or Firm*—Sughrue, Mion, Zinn, Macpeak & Seas

[57] ABSTRACT

A magnetic head positioning mechanism includes at least one rotatable magnetic disk medium, a magnetic head, and a carriage. A magnetic signal is recorded in the rotatable magnetic disk medium. The magnetic head is moved on the magnetic disk medium to record/reproduce the magnetic signal. The carriage movably holds the magnetic head and has an insulating surface on which an electric wiring line for connecting the magnetic head to a control board is formed.

8 Claims, 3 Drawing Sheets

MAGNETIC HEAD POSITIONING MECHANISM HAVING ELECTRICAL WIRING PLATED THEREUPON

BACKGROUND OF THE INVENTION

The present invention relates to a magnetic head positioning mechanism for a magnetic disk apparatus.

A magnetic disk apparatus performs recording and reproducing operations such that a magnetic signal recorded in a magnetic disk medium rotated at high speed is converted into an electrical signal by a magnetic head which is moved while floating above the surface of the magnetic disk medium. For this reason, the electrical signal from the magnetic head must be connected to a control board. A carriage having the magnetic head must be compact and lightweight to write and read data at high speed. Therefore, a compact, lightweight flexible printed board is used as wiring lines on the carriage, and electric parts such as ICs are mounted on the flexible printed board.

FIG. 5 perspectively shows a conventional magnetic head positioning mechanism. A plurality of arms 30 arranged at predetermined intervals in the form of a comb-like section are arranged in a carriage 3, and suspensions 20 are fixed to the distal ends of the arms 30 with screws, respectively. One or two magnetic heads 2 are connected to the distal end of each of the suspensions 20 in correspondence with the surface of a corresponding one or the surfaces of the adjacent ones of a plurality of magnetic disk media 1 which are stacked at predetermined intervals. A flexible printed board 4 on which electric wiring lines 5 for connecting the magnetic head 2 to a control board (not shown) are printed is fixed on one side surface of the carriage 3, and an amplifier IC 6 and electric parts 7 are mounted on the flexible printed board 4 arranged on the side surface of the carriage 3. Reference numeral 8 denotes a coil for driving the carriage 3.

In recent years, however, as the magnetic disk device has a small size and a high density, the carriage 3 for mounting the magnetic heads 2 thereon has a smaller size, a lighter weight, and a more complex shape. In such a carriage the wiring lines must be formed a complex-shaped surface. The flexible printed board 4 for the wiring lines must consists of a thin and soft material that can be deformed to conform to the three-dimensional shape of the side surface of the carriage 3 or the like. However, a wiring, e.g., a bridge wiring or the like, which has a three-dimensional shape that cannot be developed into a plane, cannot be formed on the flexible printed board 4 because the flexible printed board 4 consists of a two-dimensional sheet material. In addition, even when the printed electric wiring lines 5 themselves can conform to a three-dimensional shape, the mounted amplifier IC 6 and the electric parts 7 cannot conform to the three-dimensional shape.

SUMMARY OF THE INVENTION

It is an object of the present invention to provide a magnetic head positioning mechanism capable of supporting complex electric wiring lines on a carriage.

In order to achieve the above object, according to the present invention, there is provided a magnetic head positioning mechanism comprising at least one rotatable magnetic disk medium in which a magnetic signal is recorded, a magnetic head moved on the magnetic disk medium to record/reproduce the magnetic signal, a carriage, movably holding the magnetic head and having an insulating surface on which an electric wiring line for connecting the magnetic head to a control board is formed.

DESCRIPTION OF THE PREFERRED EMBODIMENT

Figure 1:
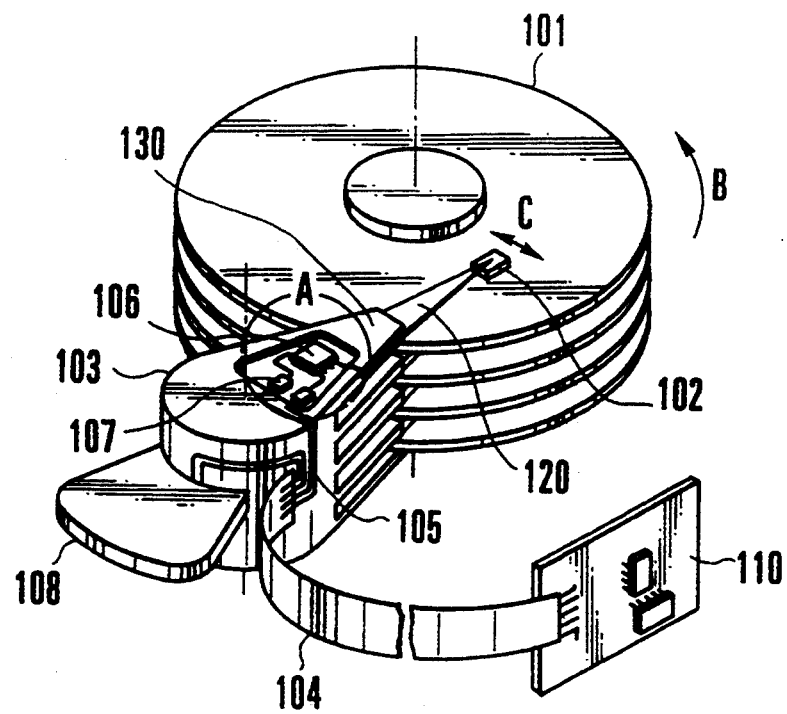
FIG. 1 is a perspective view showing a magnetic head positioning mechanism according to an embodiment.
Figure 2:
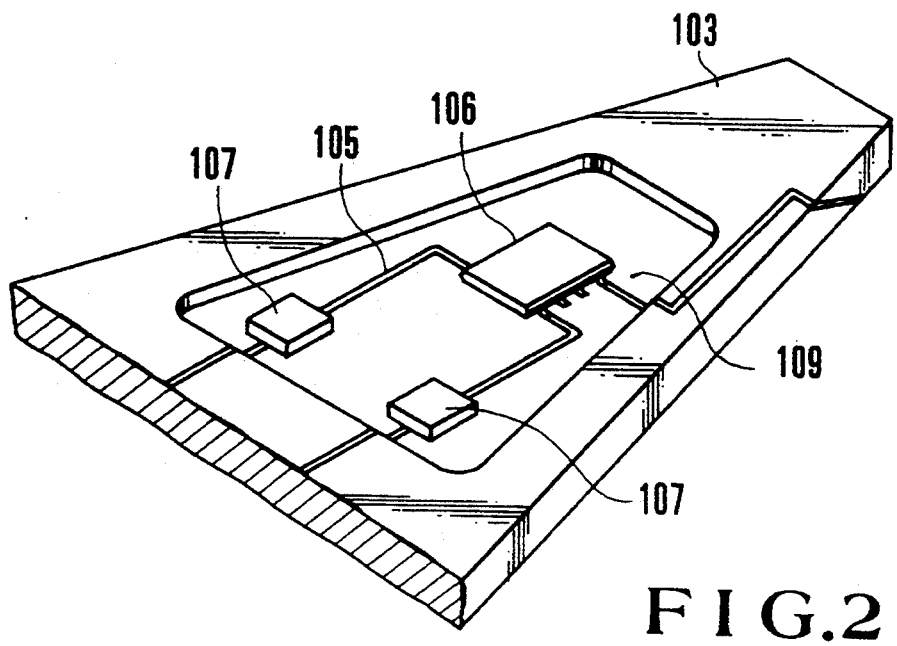
FIG. 2 is an enlarged view showing an A portion in FIG. 1.

The present invention will be described below with reference to the accompanying drawings. FIG. 1 shows a magnetic head positioning mechanism according to an embodiment of the present invention, and FIG. 2 shows an A portion in FIG. 1. In FIGS. 1 and 2, a plurality of arms 130 arranged at predetermined intervals in the form of a comb-like section are arranged in a carriage 103, and suspensions 120 are fixed to the distal ends of the arms 130 with screws, respectively. One or two magnetic heads 102 are connected to the distal end of each of the suspensions 120 in correspondence with the surface of a corresponding one or the surfaces of adjacent ones of a plurality of magnetic disk media 101 which are stacked at predetermined intervals. A recessed portion 109 is formed in the upper surface of the carriage 103, i.e., on the upper surface of the uppermost arm 130, electric wiring lines 105 for connecting the magnetic head 102 to a control board (not shown) are formed on the upper surface of the carriage 103 including the recessed portion 109, and an amplifier IC 106 and electric parts 107 such as resistors and capacitors are mounted in the recessed portion 109 so as to be connected to the electric wiring lines 105. One end of a band-like flexible printed board 104 is fixed on a rear portion of a side surface of the carriage 103, and the electric wiring lines 105 on the carriage 103 are connected to the flexible printed board 104. The other end of the flexible printed board 104 is connected to a control board 110 on which a recording/reproducing IC and the like are mounted. Reference numeral 108 denotes a coil, connected to the control board 110 through the flexible printed board 104 and the electric wiring lines 105, for driving the carriage 103 to swing it in the directions of an arrow C.

In the magnetic head positioning mechanism arranged as described above, data recorded in the magnetic disk media 101 rotated in the direction of an arrow B are recorded and reproduced such that the magnetic heads 102 are relatively moved on the magnetic disk media 101. In reproducing data, magnetic signals recorded in the magnetic disk media 101 are converted into electrical signals by the magnetic heads 102. The electrical signals converted from magnetic signals by the magnetic heads 102 are easily influenced by external noise because the electrical signals have a very small amplitude. For this reason, the electrical signals converted by the magnetic heads 102 pass through the electric wiring lines 105 formed on the surface of the carriage 103. In order to suppress the influence of the external noise, the electrical signals are supplied to and amplified by the amplifier IC 106 and the electric parts 107 mounted in the recessed portion 109 of the carriage 103 near the magnetic head 102. The amplified signals are supplied to a recording/reproducing circuit (not shown) through the flexible printed board 104.

In a portion where the amplifier IC 106 and the electric parts 107 are to be mounted, when the shape of the upper surface of the carriage 103 is three-dimensionally processed to have the recessed portion 109, an electric circuit portion can be buried in the carriage 103.

The flexible printed board 104 provides the link between the movable carriage 103 and a fixed portion such as the control board 110. In this embodiment, a molded carriage which has an insulating property and in which the recessed portion 109 can easily be formed is used as the carriage 103. Preferably, the carriages surface can be plated so as to form the electric wiring lines 105 thereupon. The choice of material for the molded carriage is not limited. For example, polyether imide (PEI), a liquid crystal polymer (LCP), polycarbonate (PC), polyphenylene sulfide (PPS), or the like can be used. The surface of the molded carriage is plated, a wiring pattern portion is subjected to masking, and an unnecessary portion is processed by etching, thereby forming the electric wiring lines 105 on the surface of the molded carriage.

In the preferred embodiment the portion in which the electric wiring lines 105 of the carriage 103 are formed may consist of a molded body. However, when an insulating layer is formed on the surface of the carriage 103, and the electric wiring lines 105 are formed on the surface of the insulating layer, the carriage 103 need not be a molded body and, the carriage 103 may consist of a metallic or other conductive material.

In this manner, a high-density pattern of the electric wiring lines 105 can be formed on the three-dimensional curved surface of the carriage 103 thereby permitting a carriage design of a complex shape. When the amplifier IC 106 and the electric parts 107 such as resistors and capacitors are mounted on the electric wiring lines 105 in the recessed portion 109, a high-density electrical circuit can be formed.

Figure 3A:
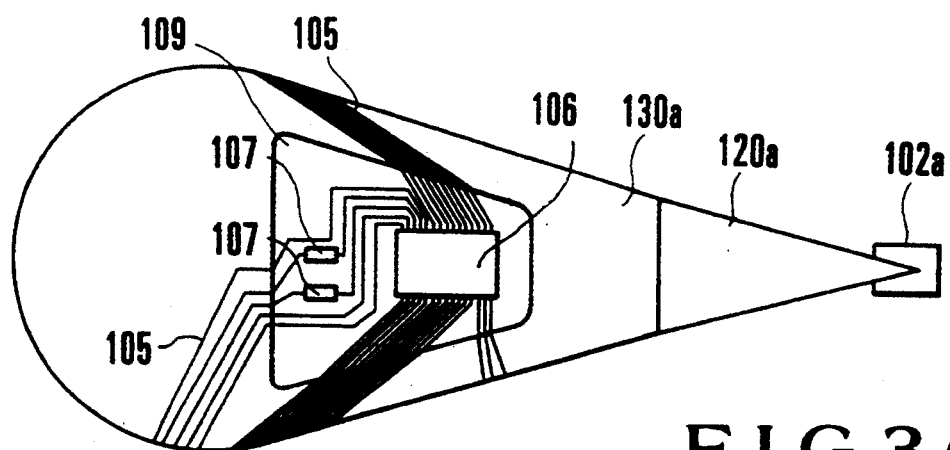
FIG. 3A is plan view showing a carriage in FIG. 1.
Figure 3B:
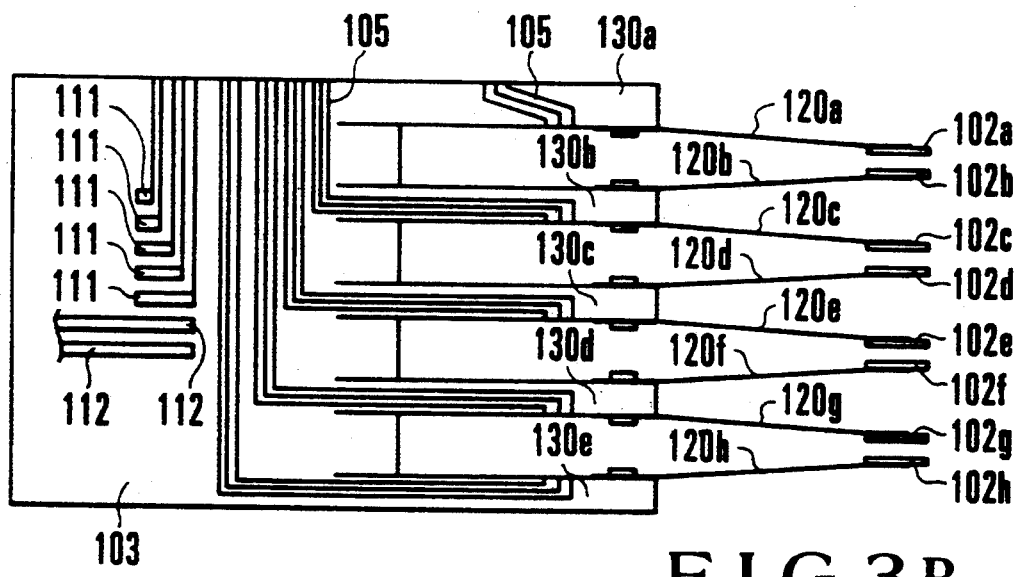
FIG. 3B is a side view showing the carriage in FIG. 3A.

The embodiment will be described in detail with reference to FIGS. 3A and 3B and FIGS. 4A and 4B. FIG. 3A shows the carriage 103 when viewed from the top direction, FIG. 3B shows the carriage 103 when viewed from a side direction. The carriage 103 has five arms 130a to 130e, and right suspensions 120a to 120h supporting magnetic heads 102a to 102h and fixed to the distal ends of the arms 130a to 130e. The magnetic heads 102a and 102h are attached to suspensions 120a, and 120h, which are arranged on the uppermost arm 130a, and the lowermost arm 130e, respectively. The magnetic heads 102b and 102c, the magnetic heads 102d and 102e, and the magnetic heads 102f and 102g are attached to suspensions 120b to 120g which are arranged on the intermediate arms 130b to 130d with the respectively. Therefore, a total of the eight magnetic heads 102a to 102h are arranged in this apparatus enabling access to form magnetic media disks 101. The amplifier IC 106 incorporates an 8-channel amplifier and is used in a recording/reproducing operation. A one-channel amplifier is connected to one of the magnetic heads 102a to 102h with, e.g., three signal lines. These signal lines are formed by plating as the electric wiring lines 105 on the surface of the carriage 103, and the signal lines pass from the carriage 103 through the side surface of the arms 130a to 130e to reach a portion near the portion in which the suspensions 120a to 120h are arranged. Each of the arms 130b, 130c, and 130d has two suspensions, and three signal lines are formed on each side of each of the arms 130b to 130d and reach the opposite surfaces on which the suspensions 120b to 120g are arranged.

Figure 4A:
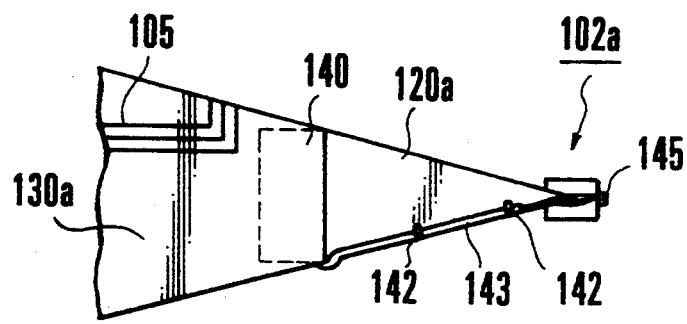
FIG. 4A is a plan view showing a portion where a suspension is mounted on an arm of the carriage.
Figure 4B:
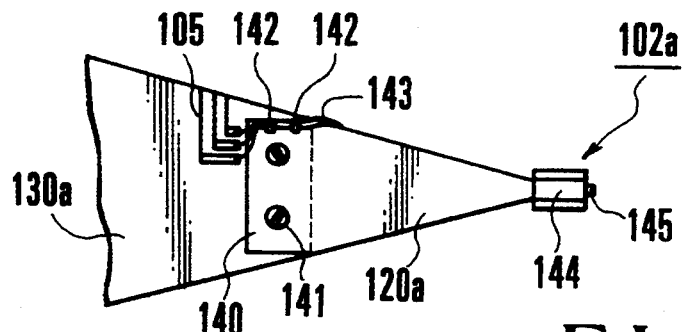
FIG. 4B is a bottom view showing the portion in FIG. 4B.
Figure 5:
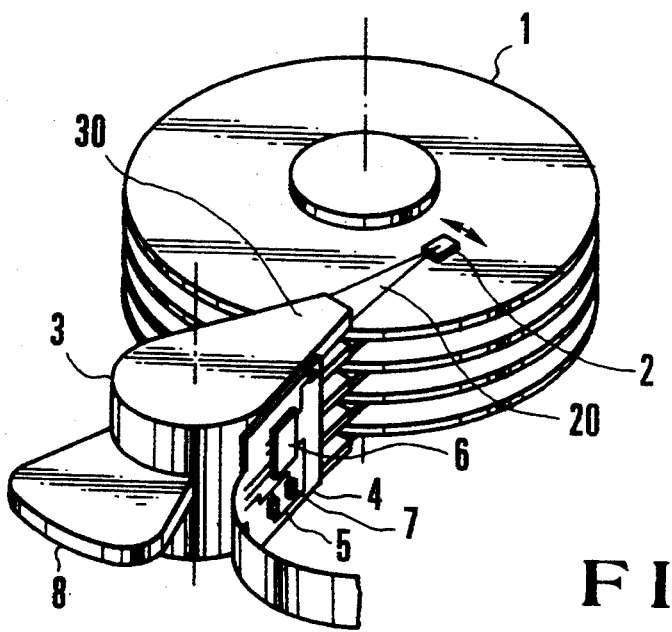
FIG. 5 is a perspective view showing a conventional magnetic head positioning mechanism.

FIG. 4A shows the portion in which the suspensions are attached to the arm, as viewed from the upper direction, and FIG. 4B shows the portion in FIG. 4A when viewed from the lower direction. For illustration purpose, FIGS. 4A and 4B show the arm 130a, and the suspension 120a, arms 130b, to 130e, and the suspensions 120b, to 120h, are also arranged as shown in FIGS. 4A and 4B. The suspension 120a, is fixed to the arm 130a, at a support portion 140 with screws 141. A slider 144 having an electromagnetic conversion element 145 is supported at the distal end of the suspension 120a, thereby constituting the magnetic head 102a. A flange (not shown) is arranged on a side portion of the suspension 120a, to make it rigid, and four projections 142 are formed on the side portion of the suspension 120a. The projections 142 are formed to support a cable 143 passing along the side portion of the suspension 120a. Three lines which are insulated from each other pass through the cable 143 to connect the electromagnetic conversion element 145 to the pattern of the electric wiring lines 105 formed on the arm 130a.

As described above, the amplifier IC 106 is electrically connected to the magnetic heads 102a to 102h through the electric wiring lines 105 and the cable 143. Connection between the amplifier IC 106 and a host circuit, i.e., a power supply operation, an input/output operation of a signal, and the like, is performed through the pattern of the electric wiring lines 105 plated on the surface of the carriage 103. The electric parts 107 are mounted on the surfaces of the wiring lines extending from the amplifier IC 106. The patterns of these wiring lines reach the side surface of the carriage 103 to form terminals 111 on the side surface, as shown in FIG. 3B Terminals 112 are formed simultaneously with the formation of the terminals 111, and are used to supply a current to the coil 108. The terminals 111 and 112 are arranged in a line, and the end portion of the flexible printed board 104 is fixed to the terminals to be electrically connected to the terminals.

As has been described above, the carriage of the magnetic disk apparatus comprises a molded body, and the electric wiring lines are formed on the surface of the carriage by plating. Complex wiring lines can extend on the carriage surface, and a large number of electrical parts can be mounted.

The weight of the carriage can be reduced by appropriate molding, and the inertia of the carriage is decreased by the elimination of the special circuit board.

What is claimed is:

1. A magnetic head positioning mechanism comprising:
   at least one rotatable magnetic disk medium on which a magnetic signal is recorded;
   a magnetic head movable above said magnetic disk medium to record/reproduce the magnetic signal;
   a carriage for swingably holding said magnetic head, said carriage having an insulating surface on which a wiring line pattern for connecting between said magnetic head and an external control board is formed;

a recessed portion, formed on the insulating surface of said carriage, having a bottom surface on which a part of said wiring line pattern is formed; and, an electric part mounted on said wiring line pattern in said recessed portion.

2. A mechanism according to claim 1, wherein said recessed portion is formed on an upper surface of said carriage.

3. A mechanism according to claim 1, wherein said carriage includes upper and side surfaces and said wiring line pattern is formed thereupon.

4. A mechanism according to claim 1, further comprising a flexible printed board, fixed in parallel to a swing axis of said carriage onto a side surface of said carriage, for connecting between said carriage and the external control board, wherein one end of said flexible printed board is electrically connected to said wiring line pattern on the side surface of said carriage, and said flexible printed board flexibly bends in accordance with a swing operation of said carriage.

5. A mechanism according to claim 1, wherein said carriage is formed of a metal having an insulating surface, and said wiring line pattern is formed on the insulating surface.

6. A mechanism according to claim 1, wherein said carriage including the insulating surface is made of resin.

7. A magnetic head positioning mechanism comprising:

at least one rotatable magnetic disk medium on which a magnetic signal is recorded;

a magnetic head movable above said magnetic disk medium to record/reproduce the magnetic signal;

a carriage for swingably holding said magnetic head, said carriage having an insulating surface on which a wiring line pattern for connecting between said magnetic head and an external control board is formed;

a recessed portion, formed on an upper surface of said carriage, having a bottom surface on which a part of said wiring pattern is formed, the other of said wiring line pattern is formed on the upper and a side surfaces of said carriage; and an electric part mounted on a part of said electric wiring line pattern in said recessed portion.

8. A mechanism according to claim 7, further comprising a flexible printed board, fixed in parallel to a swing axis of said carriage onto the side surface of said carriage, for connecting between said carriage and the external control board, wherein one end of said flexible printed board is electrically connected to said electric wiring line pattern on the side surface of said carriage, and said flexible printed board flexibly bends in accordance with a swing operation of said carriage.

* * * * *